(12) United States Patent (10) Patent No.: US 11,002,865 B2
Roessl et al. (45) Date of Patent: May 11, 2021

(54) DETECTION VALUES DETERMINATION SYSTEM

(71) Applicant: KONINKLIJKE PHILIPS N.V., Eindhoven (NL)

(72) Inventors: Ewald Roessl, Ellaru (DE); Roger Steadman Booker, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 331 days.

(21) Appl. No.: 15/776,085

(22) PCT Filed: Nov. 20, 2016

(86) PCT No.: PCT/EP2016/078216
§ 371 (c)(1),
(2) Date: May 15, 2018

(87) PCT Pub. No.: WO2017/085304
PCT Pub. Date: May 26, 2017

(65) Prior Publication Data
US 2018/0329086 A1 Nov. 15, 2018

(30) Foreign Application Priority Data
Nov. 20, 2015 (EP) ..................................... 15195557

(51) Int. Cl.
 *G01T 1/29* (2006.01)
(52) U.S. Cl.
 CPC .................. *G01T 1/2928* (2013.01)
(58) Field of Classification Search
 CPC ... G01T 1/2985; G01T 1/2018; G01T 1/2928; A61B 6/4291
 See application file for complete search history.

(56) References Cited

U.S. PATENT DOCUMENTS 10,365,380 B2 * 7/2019 Steadman Booker .. G01T 1/247
10,677,942 B2 * 6/2020 Cao ........................ G01T 1/2928
(Continued)

FOREIGN PATENT DOCUMENTS

DE 102008004748 7/2008

OTHER PUBLICATIONS

Donmez, et al., "3D positron sensing on UltraPeRL CdZnTE detectors"; Nuclear Science Symposium Conference Record; 2007.

*Primary Examiner* — David P Porta
*Assistant Examiner* — Fani Boosalis
(74) *Attorney, Agent, or Firm* — Larry Liberchuk (57) ABSTRACT

The invention relates to a detection values determination system, especially for photon-counting CT scanners, comprising a detection pulse providing unit for providing detection pulses for an array of detection pixels 17, which is provided with an anti-charge-sharing grid 15 for suppressing charge sharing between different clusters 14 of the detection pixels, wherein the detection pulses are indicative of the energy of photons incident on the detection pixels. Charge-sharing-corrected detection values are determined based on the provided detection pulses, wherein for determining a charge-sharing-corrected detection value for a detection pixel of a cluster only detection pixels of the same cluster are considered. This allows for a relatively high detective quantum efficiency, wherein the technical efforts for providing the charge sharing correction can be relatively low.

9 Claims, 7 Drawing Sheets

(56) References Cited

U.S. PATENT DOCUMENTS

| | | |
|---|---|---|
| 2007/0206721 A1 | 9/2007 | Tkaczyk |
| 2008/0175347 A1 | 7/2008 | Tkaczyk |
| 2009/0008564 A1 | 1/2009 | Balan |
| 2010/0270462 A1 | 10/2010 | Nelson |
| 2013/0153776 A1 | 6/2013 | Wieczorek |
| 2014/0175299 A1 | 6/2014 | Spahn |

* cited by examiner

DETECTION VALUES DETERMINATION SYSTEM

CROSS REFERENCE TO RELATED APPLICATIONS

This application is the U.S. National Phase application under 35 U.S.C. § 371 of International Application No. PCT/EP2016/078216, filed Nov. 20, 2016, published as WO 2017/085304 on May 26, 2017, which claims the benefit of European Patent Application Number 15195557.2 on Nov. 20, 2015. These applications are hereby incorporated by reference herein.

FIELD OF THE INVENTION

The invention relates to a detection values determination system and method for determining charge-sharing-corrected detection values to be used by an imaging system for generating an image of an object. The invention further relates to the imaging system and a computer program for controlling the detection values determination system.

BACKGROUND OF THE INVENTION

Detection values determination systems are used, for instance, in photon counting computed tomography systems. The spectral performance of the detection values determination system used in a photon counting computed tomography system is often limited by a so called charge-sharing effect, wherein charge, which is caused by a single photon, is shared between neighboring detection pixels of the detection values determination system accompanied by a complete loss of the energy information of the original photon. For example, the detection values determination system may comprise a conversion material for converting the photons into electrical pulses, wherein the conversion material is arranged between a cathode and a pixilated anode formed by an array of anode pads. If a photon is incident on a region between two neighboring anode pads, the photon causes two detection pulses, because the charge generated by the photon is shared between these two neighboring anode pads with a stochastic distribution of the total charge depending largely on the exact location of the photoelectric event having caused the charge. When the photoelectric event takes place well within a sensitive volume within the conversion material belonging to a single anode pad, the entire charge is collected at this anode pad and no degradation of spectral performance is noticeable. However, if this is not the case, charge sharing occurs, resulting in a reduced quality of the determined detection values.

In order to reduce the charge sharing effect, an anti-scatter grid can be provided, which is mounted such that the regions between the anode pads are covered. This covering of a part of the detection surface has the disadvantage that it leads to a significant loss in detective quantum efficiency (DQE) such that the quality of the determined detection values is still reduced.

SUMMARY OF THE INVENTION

It is an object of the present invention to provide a detection values determination system and method for providing detection values having an improved quality. It is a further object of the present invention to provide an imaging system for generating an image of an object, which comprises the detection values determination system, and a computer program for controlling the detection values determination system.

In a first aspect of the present invention a detection values determination system is presented, wherein the detection values determination system comprises:

a detection pulse providing unit for providing detection pulses for an array of detection pixels, which is provided with an anti-charge-sharing grid for suppressing charge sharing between different clusters of detection pixels of the array, wherein the detection pulses are indicative of the energy of photons incident on the detection pixels, a detection values determination unit for determining charge-sharing-corrected detection values based on the provided detection pulses, wherein each charge-sharing-corrected detection value corresponds to a respective detection pixel and has been corrected for charge-sharing between neighboring detection pixels, wherein the detection values determination unit is adapted to, for determining a charge-sharing-corrected detection value for a detection pixel of a cluster, only consider detection pixels of the same cluster.

Since the anti-charge-sharing grid does not suppress charge sharing between all detection pixels, but only between different clusters of detection pixels, the area of a detection surface covered by the anti-charge-sharing grid is relatively small in comparison to using an anti-charge-sharing grid covering all regions between neighboring detection pixels, which are prone to charge sharing. The DQE is therefore relatively high. The remaining intra-cluster charge sharing, i.e. the remaining charge sharing between neighboring detection pixels of a same cluster, is corrected by the detection values determination unit, wherein, since this charge sharing correction only considers detection pixels of a same cluster, the technical efforts for providing this charge sharing correction can be relatively low. The detection values determination system can therefore provide charge-sharing-corrected detection values having an improved quality with relatively low technical efforts.

The charge-sharing corrected detection values can be charge-sharing corrected photon count values, wherein each charge-sharing-corrected photon count value is indicative of a number of photons within a respective energy range detected by a respective detection pixel, i.e. for a respective detection pixel several charge-sharing corrected photon count values can be determined, which correspond to different energy ranges. The charge-sharing corrected detection values can also be other kinds of detection values. For instance, they can be decomposed detection values which correspond to different materials and/or to different physical effects like the Compton effect, the photoelectric effect and/or a K-edge effect, i.e. for a respective detection pixel several charge-sharing corrected decomposed detection values can be determined, which may also be regarded as being charge-sharing corrected component values and which correspond to different materials and/or different physical effects.

The detection pulse providing unit can comprise the array of detection pixels. Furthermore, the detection pulse providing unit can also comprise the anti-charge-sharing grid with which the array of detection pixels is provided. For instance, the detection pulse providing unit can comprise several detection pixels, wherein each detection pixel can comprise a) a detection pulse generating unit formed, for instance, by a conversion material in between a cathode and an anode pad for generating an electrical detection pulse based on an incident photon, b) an optional amplifier for amplifying the detection pulse, which is, for example, a charge sensitive amplifier, and c) a shaper for shaping the optionally amplified detection pulse. The detection pulse generating unit, the optional amplifier and the shaper of a detection pixel can be regarded as forming a sub detection pulse providing unit of the detection pulse providing unit. The output of the shapers can be provided to the detection values determination unit for allowing the detection values determination unit to determine the charge-sharing-corrected detection values.

The detection values determination unit can comprise for each detection pixel of a cluster an analog adder, a discriminator and a counter. The adder can be adapted to a) add one or more detection pulses received from the sub detection pulse providing units of one or more other detection pixels of the same cluster to a detection pulse received from the sub detection pulse providing unit of the detection pixel and to provide the resulting summed detection pulse to a discriminator of the detection pixel or b) provide the detection pulse received from the sub detection pulse providing unit of the detection pixel to the discriminator. The discriminator can be adapted to compare the received detection pulse with at least one signal threshold and the counter can be adapted to generate at least one detection value depending on the comparison of the detection pulse with the at least one threshold. If the discriminator is adapted to compare the received detection pulse with several signal thresholds, it may be formed by several sub discriminators each having a respective threshold, wherein each sub discriminator is adapted to compare the received detection pulse with the respective threshold. Moreover, if the discriminator is adapted to compare the received detection pulse with several signal thresholds, the counter may be formed by several sub counters each generating a detection value depending on the comparison of the detection pulse with the respective threshold of a corresponding sub discriminator. The detection values determination unit preferentially further comprises a controller for controlling the detection pixels of a same cluster such that a), if the discriminator of a detection pixel of the same cluster has detected that the lowest signal threshold has been traversed in an upward direction by a detection pulse and if a priority is not assigned to another detection pixel of the same cluster, the priority is assigned to the detection pixel, and b), if the discriminator of a detection pixel has detected that the lowest signal threshold has been traversed in an upward direction by a detection pulse, if the priority is assigned to another detection pixel of the same cluster and if the time since assigning the priority to the other detection pixel is smaller than a time threshold, the sub detection pulse providing unit of the detection pixel is connected to the adder of the other detection pixel. This can ensure that the charge shared between detection pixels of a same cluster is assigned to the detection pixel which has firstly detected the photon having caused the shared charge.

The time threshold may be predefined or it may be actively determined based on the actual performance of the sub detection pulse providing unit. The time threshold preferentially corresponds to an estimated peaking time of the detection pulse provided by the respective sub detection pulse providing unit, i.e. it preferentially corresponds to the estimated time needed by the respective detection pulse to reach its maximum. The peaking time can be estimated by simulation based on the known construction of the sub detection pulse providing unit, wherein this simulation especially considers the transient response of the conversion material, which is arranged between the cathode and the pixelated anode and which might be, for instance, a cadmium zinc telluride (CZT) conversion material. The peaking time may also be measured, in order to consider the actual performance of the sub detection pulse providing unit In an embodiment the controller is adapted to, if the discriminator of the detection pixel having the priority has detected that at least one signal threshold has been traversed in a downward direction, disconnect the sub detection pulse providing unit of the other detection pixel of the same cluster from the adder of the detection pixel having the priority and remove the priority from the detection pixel. It is also possible that the controller is adapted to, if the discriminator of the detection pixel having the priority and/or the discriminator of the other detection pixel of the same cluster, of which the sub detection pulse providing unit is connected to the adder of the detection pixel having the priority, has detected that at least one signal threshold has been traversed in a downward direction, disconnect the sub detection pulse providing unit of the other detection pixel of the same cluster from the adder of the detection pixel having the priority and remove the priority from the detection pixel. In an embodiment the controller is adapted such that a), if the discriminator of a detection pixel has detected that the lowest signal threshold has been traversed in an upward direction by a detection pulse, if the priority is assigned to another detection pixel of the same cluster and if the time since assigning the priority to the other detection pixel is smaller than a time threshold which may be predefined, the sub detection pulse providing unit of the detection pixel is connected to the adder of the other detection pixel and the counter of the detection pixel is disabled, and b), if the discriminator of the detection pixel having the priority has detected that at least one signal threshold has been traversed in a downward direction, the sub detection pulse providing unit of the other detection pixel of the same cluster is disconnected from the adder of the detection pixel having the priority, the counter of the other detection pixel of the same cluster is enabled and the priority is removed from the detection pixel. This can ensure that a detection pixel provides its charge to another detection pixel of the same cluster, which has the priority, no longer as needed for correctly considering the charge sharing effect. In particular, it can ensure that the adding function is not paralyzed in high pile-up conditions.

The detection values determination unit can be adapted such that there is a sufficient delay between detecting a transition of a signal threshold by a discriminator of a detection pixel and considering this transition by a counter of the detection pixel, which allows the counter to become disabled in response to a detected transition of the signal threshold, before the counter would consider the transition. This can ensure that the counter does not count a transition detected by the discriminator, although this transition should not be counted, because the respective charge should be provided to another detection pixel of the same cluster. Thereby further improving the quality of the determined charge-sharing-corrected detection values.

In an embodiment the controller is adapted such that a), if the discriminator of a detection pixel has detected that the lowest signal threshold has been traversed in an upward direction by a detection pulse, if the priority is assigned to another detection pixel of the same cluster and if the time since assigning the priority to the other detection pixel is smaller than a time threshold which may be predefined, the sub detection pulse providing unit of the detection pixel is connected to the adder of the other detection pixel and the discriminator of the detection pixel is disconnected such that it is unable to receive a detection pulse, and b), if the discriminator of the detection pixel having the priority has detected that at least one signal threshold has been traversed in a downward direction, the sub detection pulse providing unit of the other detection pixel of the same cluster is disconnected from the adder of the detection pixel having the priority, the discriminator of the other detection pixel of the same cluster is connected such that it is able to receive a detection pulse and the priority is removed from the detection pixel. Also this can ensure that the charge of a detection pixel not having the priority is provided to the detection pixel of the same cluster having the priority, wherein this charge only contributes to the count value of the detection pixel having the priority and not to the count value of the detection pixel not having the priority. This also allows for an improvement of the quality of the determined charge-sharing-corrected detection values.

In an embodiment the controller is adapted such that, if at the same time the discriminators of two or more different detection pixels of a same cluster have detected that the respective lowest signal threshold has been traversed in an upward direction by a respective detection pulse and if the priority is not assigned to another detection pixel of the same cluster, the priority is assigned to one of these two or more different detection pixels in accordance with predefined assignment rules. This can prevent a metastable state which could generally occur, if the generated charge is distributed almost identically across two or more detection pixels of a same cluster. The predefined assignment rules can define, for instance, a ranking of detection pixels of a same cluster, wherein, if at the same time the discriminators of two or more different detection pixels of a same cluster have detected that the respective lowest signal threshold has been traversed in an upward direction by a respective detection pulse and if the priority is not assigned to another detection pixel of the same cluster, the priority can be assigned to one of these two or more different detection pixels in accordance with this ranking.

The discriminator of a detection pixel can comprise a single signal threshold or several signal thresholds for distinguishing between different energies. In particular, for different energy bins, which can be defined by the regions between two neighboring signal thresholds, different detection values can be determined such that the detection values determination system determines spectral charge-sharing-corrected detection values.

The anti-charge-sharing grid preferentially comprises lamellae arranged between anode pads of the pixelated anode, in order to reduce charge sharing. In an embodiment the anti-charge-sharing grid is an anti-scatter grid.

In an embodiment the detection values determination system further comprises an input unit for receiving a clustering input defining a desired clustering of the detection pixels, wherein the detection values determination unit is adapted to consider the desired clustering defined by the clustering input while determining a charge-sharing-corrected detection value for a detection pixel. This allows the detection values determination unit to be used with different cluster sizes and/or cluster arrangements. For instance, if the clustering of the detection pixels is modified by modifying the anti-charge-sharing grid, the detection values determination unit may simply be adapted to the modified clustering by just allowing, for instance, a user to input the new clustering scheme.

In an embodiment the detection values determination unit is adapted to determine charge-sharing-corrected detection values for a detection pixel of a cluster, only if the rate of providing the detection pulses for the detection pixels of the cluster is smaller than a predefined threshold. If the rate of providing the detection pulses is too high, the charge-sharing-correction may be adversely affected by pile-up effects. In this situation the detection values are therefore preferentially not charge-sharing corrected.

In a further embodiment the detection values determination unit is adapted to determine non-charge-sharing-corrected photon count values for each detection pixel based on the provided detection pulses, wherein each non-charge-sharing-corrected photon count value is indicative of a number of photons within a certain energy range detected by a respective detection pixel, to provide a model for modeling charge sharing effects, wherein the model is adapted to consider charge sharing only between detection pixels of a same cluster, and to determine the charge-sharing corrected detection values by using the provided model and the determined non-charge-sharing corrected photon count values. In an embodiment the detection values determination unit is adapted to correct the non-charge-sharing-corrected photon count values for charge sharing by using the provided model, in order to determine charge-sharing corrected photon count values. In this embodiment each detection pixel can comprise, besides the detection pulse generating unit, the optional amplifier and the shaper, a discriminator with several signal thresholds and a counter for generating non-charge-sharing-corrected photon count values depending on the transitions of the signal thresholds by the detection pulses such that for each detection pixel spectral non-charge-sharing-corrected photon count values can be provided. An adder as described above is not necessarily needed in this embodiment, i.e. a relatively simple chain of a detection pulse generating unit, an optional amplifier, a shaper, a discriminator and a counter may be used for generating non-charge-sharing-corrected photon count values, which are subsequently corrected for charge sharing by using the provided model.

In an embodiment the detection values determination unit is adapted to a) provide the model such that it provides a relation between the non-charge-sharing-corrected photon count values of detection pixels of a same cluster and charge-sharing corrected decomposed detection values of the detection pixels of the same cluster, wherein the charge-sharing corrected decomposed detection values correspond to different materials and/or different physical effects, and to determine, as the detection values, charge-sharing corrected decomposed detection values by using the provided model and the determined non-charge-sharing corrected photon count values.

In a further aspect of the present invention an imaging system for generating an image of an object is presented, wherein the imaging system comprises:

a detection values determination system for determining charge-sharing-corrected detection values as defined in claim 1, wherein the detection pulse providing unit is adapted to provide detection pulses being indicative of photons having traversed the object and being incident on the detection pixel, an image generation unit for generating an image of the object based on the determined charge-sharing corrected detection values.

In a further aspect of the present invention a detection values determination method is presented, wherein the detection values determination method comprises:

providing detection pulses for an array of detection pixels, which is provided with an anti-charge-sharing grid for suppressing charge sharing between different clusters of detection pixels of the array, by a detection pulse providing unit, wherein the detection pulses are indicative of the energy of photons incident on the detection pixels, determining charge-sharing-corrected detection values by a detection values determination unit, wherein each charge-sharing-corrected detection value corresponds to a respective detection pixel and has been corrected for charge-sharing between neighboring detection pixels, wherein the detection values determination unit is adapted to, for determining a charge-sharing-corrected detection value for a detection pixel of a cluster, only consider detection pixels of the same cluster.

In a further aspect of the present invention a computer program for controlling a detection values determination system is presented, wherein the computer program comprises code means for causing the detection values determination system to carry out the steps of the detection values determination method as defined in claim 14, when the computer program is run on a computer controlling the detection values determination method.

It shall be understood that the detection values determination system of claim 1, the imaging system of claim 13, the detection values determination method of claim 14 and the computer program of claim 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
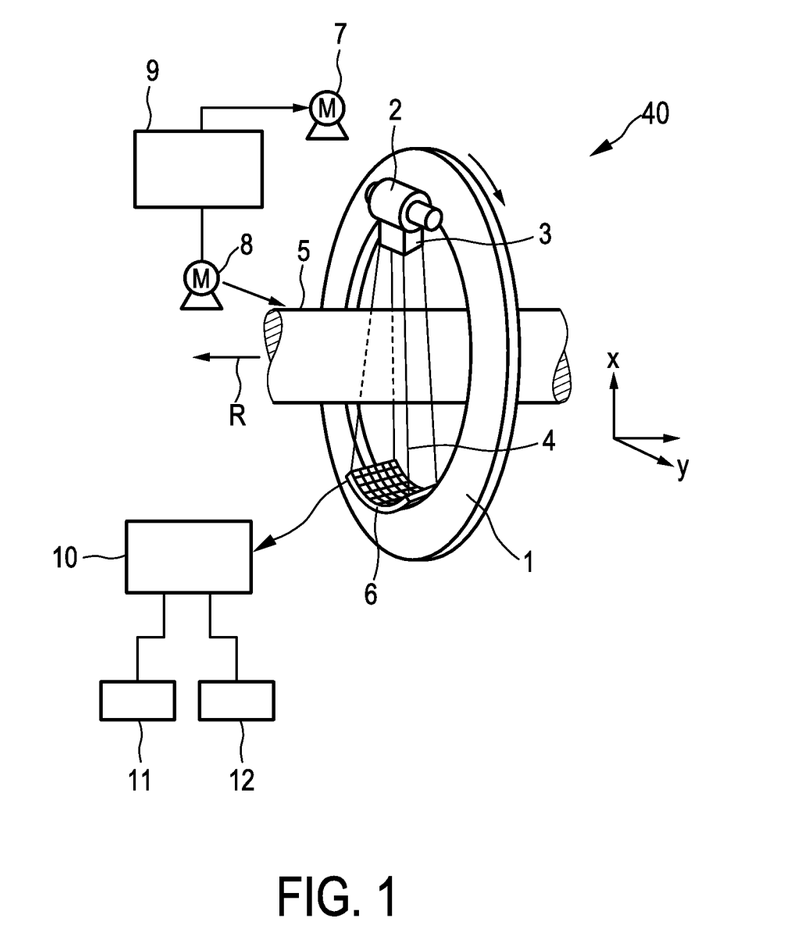
FIG. 1 shows schematically and exemplarily an embodiment of an imaging system for generating an image of an object.

FIG. 1 shows schematically and exemplarily an embodiment of an imaging system for generating an image of an object. In this embodiment the imaging system is a computed tomography system 40. The computed tomography system 40 comprises a gantry 1 which is capable of rotation about a rotational axis R which extends parallel to a z direction. A radiation source 2, which in this embodiment is an x-ray tube, is mounted on the gantry 1 and is provided with a collimator 3 which forms a conical radiation beam 4 from the radiation generated by the radiation source 2. The radiation traverses the object being, in this embodiment, a human patient within a cylindrical examination zone 5. After having traversed the examination zone 5 and hence the patient the radiation beam 4 is incident on a detection device 6 which comprises a two-dimensional detection surface. Also the detection device 6 is mounted on the gantry 1.

The computed tomography system 40 comprises two motors 7, 8. The gantry 1 is driven at a preferably constant but adjustable angular speed by the motor 7. The motor 8 is provided for displacing the patient, who is arranged on a patient table, in the examination zone 5 parallel to the direction of the rotational axis R or the z axis. These motors 7, 8 are controlled by a control unit 9, for instance, such that the radiation source 2 and the patient within the examination zone 5 move relative to each other along a helical trajectory. However, it is also possible that the radiation source 2 and the patient move relatively to each other along another trajectory. For instance, in an embodiment the radiation source 2 may move around the patient along a circular trajectory.

Figure 2:
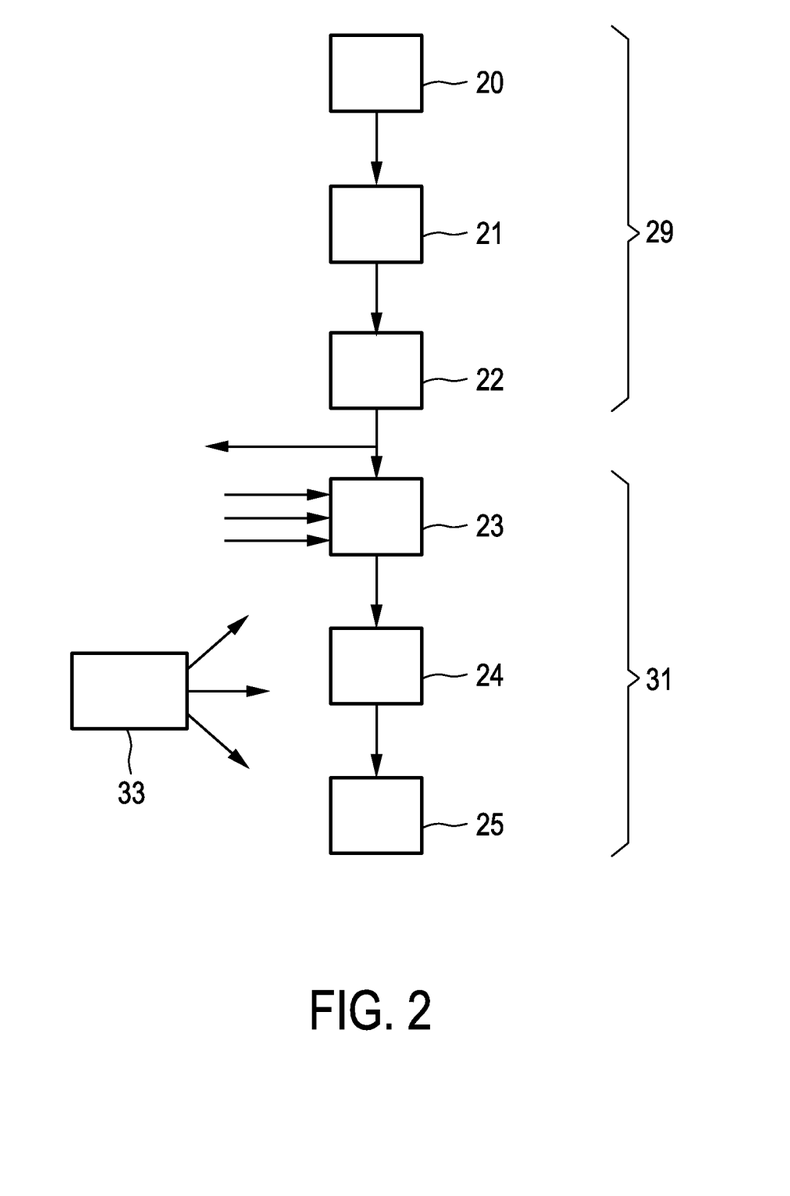
FIG. 2 shows schematically and exemplarily several components of an embodiment of a detection pixel of a detection device of the imaging system.

The detection device 6 comprises an array of detection pixels, wherein each detection pixel comprises a detection pulse generating unit 20, an amplifier 21, a shaper 22, an analog adder 23, a discriminator 24 and a counter 25 as schematically and exemplarily illustrated in FIG. 2. The detection device 6 comprises two electrodes and an intermediate conversion material for converting a photon into electrical charge, wherein at least one of the two electrodes is pixilated. Preferentially, the two electrodes are an anode and a cathode, wherein the anode is pixilated and formed of several anode pads. The conversion material is preferentially CZT or another material being able to generate electrical charge based on an incident photon like cadmium telluride (CdTe). The detection pulse generating unit 20 is preferentially formed by the cathode, the respective anode pad and the part of the conversion material between the cathode and the respective anode pad, wherein this detection pulse generating unit 20 generates an electrical detection pulse based on an incident photon and provides the generated detection pulse to the amplifier 21. The amplifier 21 amplifies the received detection pulse and provides the amplified detection pulse to the shaper 22 for shaping the detection pulse. The shaped detection pulse, which can be a voltage pulse or a current pulse, has a height or amplitude peak that is indicative of the energy of the corresponding incident photon, if no charge sharing is present. The detection pulse generating unit 20, the amplifier 21 and the shaper 22 can be regarded as forming a sub detection pulse providing unit 29, wherein the sub detection pulse providing units 29 of all detection pixels form an overall detection pulse providing unit.

The detection pixels of the detection device 6 are clustered by using an anti-charge-sharing grid being, in this embodiment, an anti-scatter grid. Since the detection pixels are clustered by using the anti-charge-sharing grid, the clusters are non-overlapping, i.e. a same detection pixel does not belong to different clusters. This clustering will in the following be illustrated with reference to FIG. 3.

Figure 3:
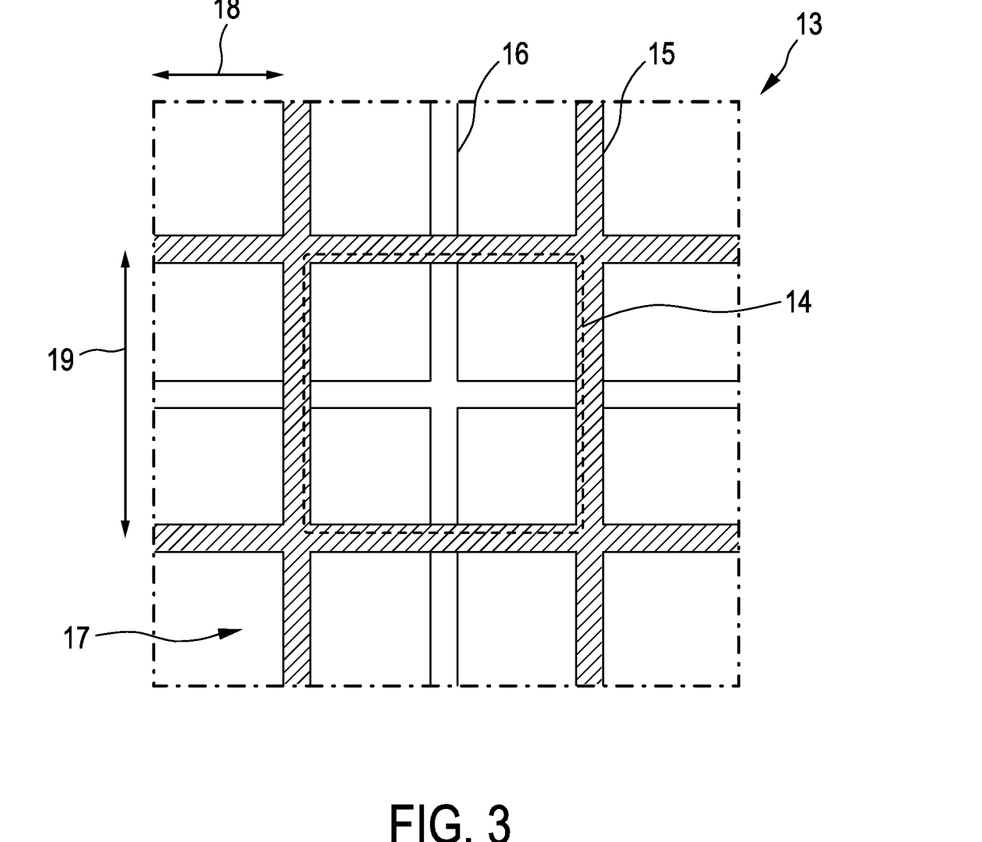
FIG. 3 illustrates schematically a clustering of detection pixels of the detection device.

FIG. 3 illustrates a part 13 of the detection device 6 with detection pixels 17, wherein the detection pixels 17 are clustered by using an anti-scatter grid 15. The anti-scatter grid 15 is mounted on charge sharing sensitive areas 16 in between the detection pixels 17. However, the anti-scatter grid 15 does not cover all charge sharing sensitive regions between the detection pixels 17, but in this embodiment only every second charge sharing sensitive region 16, i.e. the pitch 19 of the anti-scatter grid is twice the pitch 18 of the detection pixels 17. The anti-scatter grid 15 forms clusters of detection pixels 17, wherein one of these clusters denoted by reference number 14 and comprised of four detection pixels 17 is illustrated in FIG. 3.

The charge sharing between different clusters is suppressed by the anti-scatter grid 15. However, charge sharing can still be present across detection pixels of a same cluster. For this reason the adder 23 of a detection pixel 17 of a cluster is adapted to a) add one or more detection pulses received from the sub detection pulse providing units 29 of one or more other detection pixels 17 of the same cluster to a detection pulse received from the sub detection pulse providing unit 29 of the detection pixel 17 and to provide the resulting summed detection pulse to the discriminator 24 of the detection pixel 17 or b) provide the detection pulse received from the sub detection pulse providing unit 29 of the detection pixel 17 to the discriminator 24. The discriminator 24 of the respective detection pixel 17 comprises several signal thresholds and is adapted to compare the received detection pulse with the signal thresholds, wherein a controller 33 is adapted to control the detection pixels of a same cluster such that, if the discriminator 24 of a detection pixel 17 of the same cluster has detected that the lowest signal threshold has been traversed in an upward direction by a detection pulse and if a priority is not assigned to another detection pixel 17 of the same cluster, the priority is assigned to the detection pixel 17, and, if the discriminator 24 of a detection pixel 17 has detected that the lowest signal threshold has been traversed in an upward direction by a detection pulse, if the priority is assigned to another detection pixel 17 of the same cluster and if the time since assigning the priority to the other detection pixel is smaller than a predefined time threshold, the sub detection pulse providing unit 29 of the detection pixel 17 is connected to the adder 23 of the other detection pixel 17. Thus, if charge sharing occurs, the shared charge is provided to the detection pixel having firstly detected the charge.

The discriminator 24 of a respective detection pixel 17 compares the received detection pulse with several signal thresholds, which could also be regarded as being energy thresholds, in order to energy discriminate the incoming detection pulses based on the signal thresholds. The counter 25 is adapted to generate several count values depending on the comparisons of the received detection pulses with the several signal thresholds. In particular, the counter 25 is adapted to provide for each pair of neighboring signal thresholds a photon count value, i.e. for each corresponding energy bin a photon count value, wherein a photon count value for an energy bin is incremented, if a detection pulse has exceeded the lower one of the corresponding pair of signal thresholds, but not the higher one of this pair of signal thresholds. A photon count value can also be provided for detection pulses having exceeded the highest signal threshold. In another embodiment the counter 25 may be adapted to count the number of received detection pulses based on the comparisons with the thresholds in another way. For instance, the counter may just count the number of received detection pulses having exceeded the respective threshold, i.e., a first photon count value for a first threshold may be incremented, if a detection pulse has exceeded the first threshold, a second photon count value for a second threshold may be incremented, if a detection pulse has exceeded the second threshold, a third photon count value for a third threshold may be incremented, if a detection pulse has exceeded the third threshold, et cetera.

The counter 25 of a detection pixel 17 provides therefore spectral photon count values, i.e. energy-bin-dependent photon count values. These spectral photon count values are charge sharing corrected, because shared charge has been reunited and assigned to a respective detection pixel by using the adder 23 of the respective detection pixel as described above. The adders 23, the discriminators 24, the counters 25 and the controller 33 can therefore be regarded as forming a detection values determination unit, especially a photon count values determination unit for determining charge-sharing-corrected photon count values based on the provided detection pulses, wherein each charge-sharing-corrected photon count value is indicative of a number of photons within a predefined energy range detected by a respective detection pixel 17 and has been corrected for charge-sharing between neighboring detection pixels 17, wherein the photon count values determination unit is adapted to, for determining a charge-sharing-corrected photo count value for a detection pixel 17 of a cluster, only consider detection pixels 17 of the same cluster.

The controller 33 can be adapted to, if the discriminator 24 of a detection pixel 17 having the priority has detected that at least one signal threshold has been traversed in a downward direction, disconnect the sub detection pulse providing unit 29, i.e. in this embodiment the shaper 22, of the other detection pixel 17 of the same cluster from the adder 23 of the detection pixel 17 having the priority and remove the priority from the detection pixel 17. Moreover, in an embodiment the controller 33 can be adapted to, if the discriminator 24 of the detection pixel 17 having the priority and/or the discriminator 24 of another detection pixel 17 of the same cluster, of which the sub detection pulse providing unit 29, i.e. in this embodiment the shaper 22, is connected to the adder 23 of the detection pixel 17 having the priority, has detected that at least one signal threshold has been traversed in a downward direction, disconnect the sub detection pulse providing unit 29 of the other detection pixel 17 of the same cluster from the adder 23 of the detection pixel 17 having the priority and remove the priority from the detection pixel 17.

In an embodiment the controller 33 is adapted such that, if the discriminator 24 of a detection pixel has detected that the lowest signal threshold has been traversed in an upward direction by a detection pulse, if the priority is assigned to another detection pixel of the same cluster and if the time since assigning the priority to the other detection pixel is smaller than the predefined time threshold, the sub detection pulse providing unit 29 of the detection pixel is connected to the adder 23 of the other detection pixel and the counter 25 of the detection pixel is disabled. Moreover, in this embodiment the controller 33 is adapted such that, if the discriminator 24 of the detection pixel having the priority has detected that at least one signal threshold has been traversed in a downward direction, the sub detection pulse providing unit 29 of the other detection pixel of the same cluster is disconnected from the adder 23 of the detection pixel having the priority, the counter 25 of the other detection pixel of the same cluster is enabled and the priority is removed from the detection pixel. In this case there is preferentially a sufficient delay between detecting a transition of a signal threshold by a discriminator 24 of a detection pixel and considering this transition by a counter 25 of the detection pixel, which allows the counter 25 to become disabled in response to a detected transition of the signal threshold, before the counter 25 would consider the transition.

In a further embodiment the controller 33 is adapted such that, if the discriminator 24 of a detection pixel has detected that the lowest signal threshold has been traversed in an upward direction by a detection pulse, if the priority is assigned to another detection pixel of the same cluster and if the time since assigning the priority to the other detection pixel is smaller than a predefined time threshold, the sub detection pulse providing unit 29 of the detection pixel is connected to the adder 23 of the other detection pixel and the discriminator 24 of the detection pixel is disconnected such that it is unable to receive a detection pulse. Moreover, in this embodiment the controller 33 is adapted such that, if the discriminator 24 of the detection pixel having the priority has detected that at least one signal threshold has been traversed in a downward direction, the sub detection pulse providing unit 29 of the other detection pixel of the same cluster is disconnected from the adder 23 of the detection pixel having the priority, the discriminator 24 of the other detection pixel of the same cluster is connected such that it is able to receive a detection pulse and the priority is removed from the detection pixel.

The controller 33 is preferentially also adapted such that, if at the same time the discriminators 24 of two or more different detection pixels of a same cluster have detected that the respective lowest signal threshold has been traversed in an upward direction by a respective detection pulse and if the priority is not assigned to another detection pixel of the same cluster, the priority is assigned to one of these two or more different detection pixels in accordance with predefined assignment rules. Moreover, the detection system can be adapted such that the charge-sharing-corrected photon count values for a detection pixel of a cluster are only determined, if the rate of providing the detection pulses for the detection pixels of the cluster is smaller than a predefined threshold, wherein this threshold can be predefined based on calibration measurements showing until which rate of detection pulses a charge-sharing correction can be reliably performed. The controller 33 can be adapted to not use the adding function provided by the adders 23, if the rate of providing the detection pulses is larger than the predefined threshold. In this high detection pulse rate situation the output of the shaper 22 is provided to the respective discriminator 24 of a same detection pixel, without using the adding function.

The adders 23, the discriminators 24 and the counters 25 can be regarded as being components of a detection values determination unit 31 for determining charge-sharing corrected detection values.

A further embodiment of a detection values determination unit will in the following be described with reference to FIG. 4.

Figure 4:
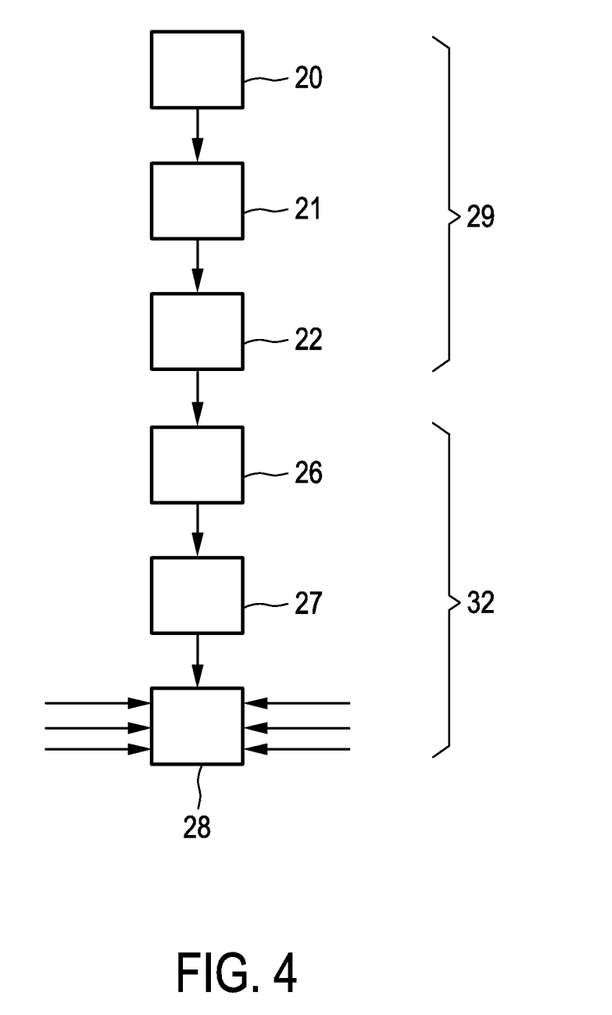
FIG. 4 shows schematically and exemplarily several components of a further embodiment of a detection pixel.

FIG. 4 schematically illustrates a sub detection pulse providing unit 29 of a detection pixel, wherein the sub detection pulse providing unit 29 includes a detection pulse generating unit 20, an amplifier 21 and a shaper 22 as described above with reference to FIG. 2. Moreover, the respective detection pixel includes a discriminator 26 and a counter 27, wherein the discriminator 26 compares the respective detection pulse received from the shaper 22 with several signal thresholds and the counter 25 generates, especially modifies, a photon count value depending on the comparison of the detection pulse with the signal thresholds. In particular, each detection pulse is compared with the signal thresholds, in order to determine for each detection pulse an energy bin to which the respective detection pulse belongs, wherein for each energy bin and each detection pixel a photon count value is present, which is incremented, if the respective detection pulse belongs to the respective energy bin.

In this embodiment the detection pixels do not comprise the adder 23 described above with reference to FIG. 2 such that the photon count values generated by the respective counter 27 are not corrected for charge sharing. The non-charge-sharing-corrected photon count values of all detection pixels are provided to a charge-sharing correction unit 28 which is preferentially a computing device being configured to perform charge sharing correction. In particular, the charge-sharing correction unit 28 is adapted to provide a model for modeling charge sharing effects, wherein the model is adapted to consider charge sharing only between detection pixels of a same cluster and to correct the non-charge-sharing-corrected photon count values for charge sharing by using the provided model. The model can be based on the known x-ray source spectrum of the radiation source 2, the patient attenuation and the known behavior of the detection device 6 when photons are incident on the detection surface of the detection device 6. The model particularly includes the knowledge about how the charge is shared between different detection pixels of a same cluster depending on the position of incidence of photons on the detection surface. The model also preferentially considers the spectral response of the detection device 6. The patient attenuation considered by the model can be an estimated patient attenuation, which may be based on a reconstruction of an image of the patient that uses the non-charge-sharing-corrected photon count values or based on an assumed attenuation distribution within the examination zone 5, which is generally present when examining a patient having a respective size, weight, gender and age. By using this model the charge sharing effects can be determined by simulation, wherein these determined charge sharing effects can be used to correct the non-charge-sharing-corrected photon count values. For instance, the simulation can reveal which photon count values are too large and which photon count values are too small because of charge sharing, wherein this can be corrected by amending the photon count values accordingly. For instance, the simulations can reveal that certain energy dependent fractions of photon count values need to be transferred from one detection pixel to another detection pixel of a same cluster and/or that some detection pulses need to be divided into two detection pulses, wherein one of these parts needs to be added stochastically to a detection pulse of a neighboring detection pixel of a same cluster. The model, which may be regarded as being a spectral forward model, just needs to consider neighboring detection pixels within a respective cluster, thereby allowing for the charge sharing correction with relatively low computational efforts. In this embodiment the discriminator 26 and the counter 27 of all detection pixels and the charge-sharing correction unit 28 can be regarded as forming a detection values determination unit 32, especially a photon count values determination unit 32. The charge-sharing correction unit 28 may be a separate unit or it may be integrated into another unit, for instance, into an image generation unit 10 of the computed tomography system 40.

The charge-sharing correction unit 28 can also be adapted to determine charge-sharing corrected detection values based on the non-charge-sharing corrected photon count values and based on a model in another way. In particular, the charge-sharing correction unit 28 can be adapted to a) provide a model such that it provides a relation between the non-charge-sharing-corrected photon count values of detection pixels of a same cluster and charge-sharing corrected decomposed detection values of the detection pixels of the same cluster, wherein the charge-sharing corrected decomposed detection values correspond to different materials and/or different physical effects, and b) determine, as the detection values, charge-sharing corrected decomposed detection values by using the provided model and the determined non-charge-sharing corrected photon count values. The decomposed detection values can also be regarded as being component values. The model can be a forward model in analytic form expressing expected non-charge-sharing corrected photon count values $n_b^i$ for an i-th detection pixel of a cluster depending on charge-sharing corrected component values $A_m^j$ for the detection pixels of the same cluster, wherein the index b denotes a respective energy range, the index j denotes a respective detection pixel of the same cluster and the index m denotes the respective component. The forward model is adapted to consider charge sharing only between detection pixels of a same cluster, wherein the charge-sharing correction unit 28 can be adapted to estimate the charge-sharing corrected component values $A_m^j$ such that the expected non-charge-sharing corrected photon count values $n_b^i$ are as close as possible to the measured non-charge-sharing corrected photon count values received from the counter 27. As an estimator the charge-sharing correction unit 28 may use least-squares, maximum-likelihood, et cetera.

As an example, the forward model may be defined by following equation:

$$n_b^i = \int_0^\infty dE \Phi(E) S_b^{ii}(E) \exp\left(-\sum_{m=1}^s A_m^i \mu_m(E)\right) + \int_0^\infty dE \Phi(E) S_b^{ij}(E) \exp\left(-\sum_{m=1}^s A_m^j \mu_m(E)\right),$$

wherein $\Phi(E)$ denotes the spectrum of the radiation source 2, $S_b^{ij}$ denotes the sensitivity of an i-th detection pixel of a cluster to counts generated for an j-th detection pixel of the same cluster and $\mu_m(E)$ denotes the spectral attenuation of the m-component. The radiation spectrum $\Phi(E)$, the sensitivity S and the spectral attenuation $\mu_m(E)$ are known, for instance, from initial calibration measurements, such that the charge-sharing correction unit can determine the components $A_m^j$ for detection pixels of a same cluster such that the modeled non-charge-sharing corrected photon count values $n_b^i$ for the detection pixels of the same cluster are similar or substantially equal to the measured non-charge-sharing corrected photon count values received from the counter 27.

The imaging system 40 further comprises an input unit 11 like a keyboard, a computer mouse, a touch pad, et cetera and a display 12. The input unit 11 can be adapted to allow a user to input a clustering input defining a desired clustering of the detection pixels, wherein the photon count values determination unit can be adapted to consider the desired clustering defined by the clustering input while determining the charge-sharing-corrected-photon count values for a detection pixel. The input unit may be adapted to allow for changes in software and/or hardware configurations, in order to amend the clustering, especially the size of the clusters. This allows the detection values determination system to be used with different clusterings of the detection pixels as defined by the anti-charge-sharing grid. Thus, if another anti-charge-sharing grid having another clustering is used, the same detection values determination unit, especially the same charge-sharing correction unit 28, may be used by inputting the new clustering into the detection values determination system. Since the clustering input is an input into the detection values determination system, wherein the input unit 11 is used, this input unit 11 may also be regarded as being an input unit of the detection values determination system.

During a relative movement of the radiation source 2 and the patient the detection device 6 generates the detection pulses depending on the photons incident on the detection surface of the detection device 6. These detection pulses can be used for determining charge-sharing corrected photon count values as described above, wherein these charge-sharing-corrected photon count values can be used by the image generation unit 10 for generating a computed tomography image of the patient. The image generation unit 10 can be adapted to use known reconstruction algorithms like a filtered back projection algorithm or a Radon inversion algorithm for reconstructing a computed tomography image based on the generated photon count values. For instance, the image generation unit 10 can reconstruct for each energy bin a respective computed tomography image or photon count values of different energy bins may be combined for reconstructing corresponding combined computed tomography images. The image generation unit 10 can also be adapted to apply a decomposition algorithm and decompose the spectral photon count values into different materials or different physical effects like the Compton effect, the photoelectric effect and optionally also K-edge effect, in order to reconstruct images for the different materials and/or the different physical effects. The one or several reconstructed computed tomography images can finally be shown on the display 12.

The detection pulses, which are generated depending on the photons incident on the detection surface of the detection device 6 during a relative movement of the radiation source 2 and the patient, can also be used for determining charge-sharing corrected component values as described above by using an analytical model providing a relation between the non-charge-sharing corrected photon count values and charge-sharing corrected component values to be determined. These charge-sharing-corrected component values correspond to different materials and/or different physical effects and can be used by the image generation unit 10 for generating a computed tomography image of the patient. Also in this example the image generation unit 10 can be adapted to use known reconstruction algorithms like a filtered back projection algorithm or a Radon inversion algorithm for reconstructing a computed tomography image based on the generated component values. For instance, the image generation unit 10 can reconstruct for each component a respective computed tomography image or component values of different components may be combined for reconstructing corresponding combined computed tomography images.

Figure 5:
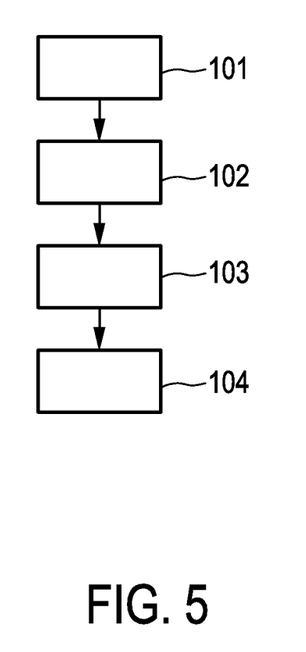
FIG. 5 shows a flowchart exemplarily illustrating an embodiment of an imaging method for generating an image of an object.

In the following an embodiment of a computed tomography method for generating a computed tomography image of a patient will exemplarily be described with reference to a flowchart shown in FIG. 5.

In step 101 the radiation source 2 rotates around the rotational axis R and the patient is moved along the rotational axis R such that the radiation source 2 moves relative to the patient along a helical trajectory. In another embodiment the radiation source 2 and the patient can be moved relatively to each other in another way, for instance, in a step-and-shoot acquisition scheme and/or along another trajectory like a circular trajectory. The radiation source 2 emits photons traversing the patient and the detection device 6 detects the photons, which have traversed the patient, and generates detection pulses which are indicative of the energy of the photons incident on the detection surface. This generation of detection pulses uses the anti-scatter grid 15, in order suppress charge sharing between different clusters of detection pixels of the detection device 6.

In step 102 charge-sharing corrected photon count values are determined, wherein each charge-sharing-corrected photon count value is indicative of a number of photons having a certain energy detected by a respective detection pixel and has been corrected for charge sharing between neighboring detection pixels, wherein for determining a charge-sharing-corrected photon count value for a detection pixel of a cluster only detection pixels of the same cluster are considered. In step 103 the charge-sharing-corrected photon count values are used by the image generation unit 10 for generating one or several computed tomography images which are shown on the display in step 104. Steps 101 and 102 can be regarded as being steps of a photon count values determination method.

The above described correction of charge sharing within a same cluster, especially the charge sharing correction described above with reference to FIG. 2, can be implemented by using an application-specific integrated circuit (ASIC).

The clustering of the detection pixels and hence the clustering of charge sharing can significantly simplify the electronics required to correct and assess charge sharing. While general charge-sharing circuitry without an anti-charge-sharing grid, especially without an anti-scatter grid, needs to consider fully two-dimensional charge sharing, the clustering of the detection pixels has the advantage that, for instance in a 2×2 clustering situation as illustrated in FIG. 3, each detection pixel only needs to "listen" to two nearest neighbors or to three next-two nearest neighbors, if also the diagonally neighboring pixel should be considered, in a charge-sharing detection circuitry, as illustrated in FIG. 6.

Figure 6:
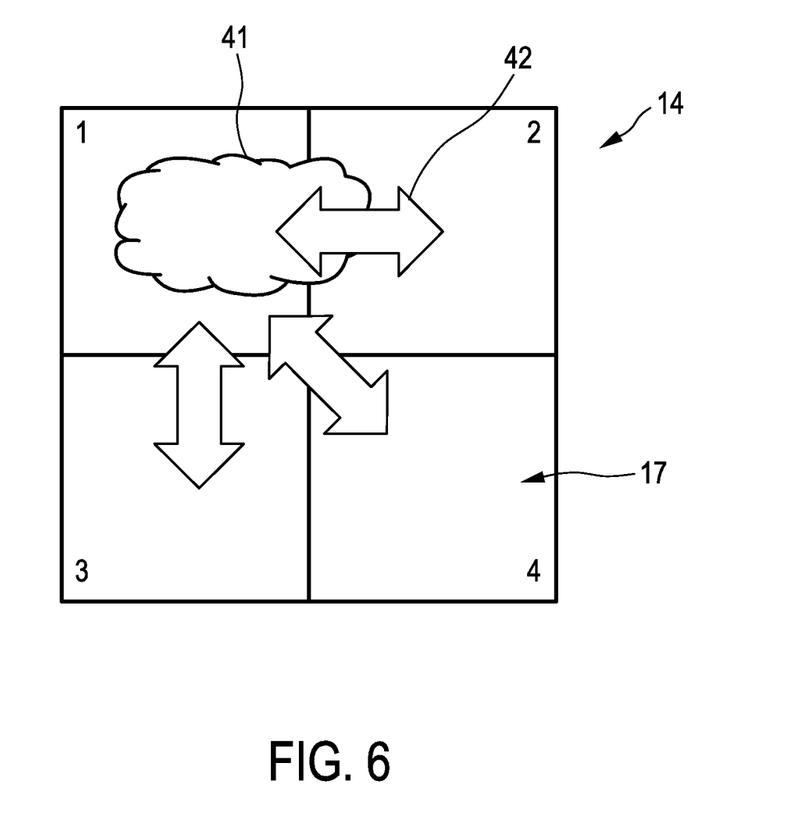
FIG. 6 illustrates schematically detection pixels to be considered during charge sharing correction.

FIG. 6 exemplarily and schematically illustrates a cluster 14 comprising four detection pixels 17, wherein for determining charge-sharing-corrected photon count values for the detection pixel indicated by the number "1", it does only need to be considered whether charge 41 is shared with two or three neighboring detection pixels of the same cluster as indicated by the arrows 42. Preferentially this observation is also confined, i.e. hardwired, to the detection pixels of the respective cluster, for instance, to the four detection pixels of a same cluster, without the need to propagate analog signals beyond these boundaries. It should be noted that, although exemplarily four detection pixels per cluster are mentioned here, the cluster size can of course be different.

If an ASIC is used for determining the charge-sharing-corrected photon count values, the ASIC preferentially comprises the same cluster structure as the anti-charge-sharing grid with which it may be designed to be used together, i.e. the ASIC design is preferentially tailor-made to a given anti-charge-sharing grid geometry or vice versa. The ASIC can be regarded as being a large area ASIC with a plurality of detection pixels, wherein each detection pixel contains photon counting electronics, i.e. preferentially an amplifier like a charge sensitive amplifier (CSA), a shaper, a discriminator with several signal thresholds and a counters for generating several photon count values, and optionally further supporting detection pixel specific electronics. The ASIC preferentially further comprises additional electronics, which are specific to a restricted number of detection pixels forming a cluster, wherein this additional electronics is adapted to, for instance, setting priorities for charge adding, especially as described above with reference to FIG. 2, which may also be named charge summing, within a single cluster such that no communication is required between the clusters within the ASIC. Hence, preferentially the ASIC electronics exchanges information within each cluster only. Since the sharing is now confined within the walls of one cluster, the communication and routing overhead across clusters is completely eliminated, i.e. events do not need to be propagated beyond the boundaries of a cluster. This significantly reduces the amount and complexity of arbitration circuits. For instance, in an embodiment only a single adder, which may also be named summing node, may be used for all detection pixels of a same cluster, wherein this single adder may be adapted to add detection pulses of several detection pixels of a same cluster and to provide the resulting summed detection pulse to a discriminator of one of these detection pixels, wherein this single adder or summing node per cluster may be controlled by the controller as described above with reference to FIG. 2.

Figure 7:
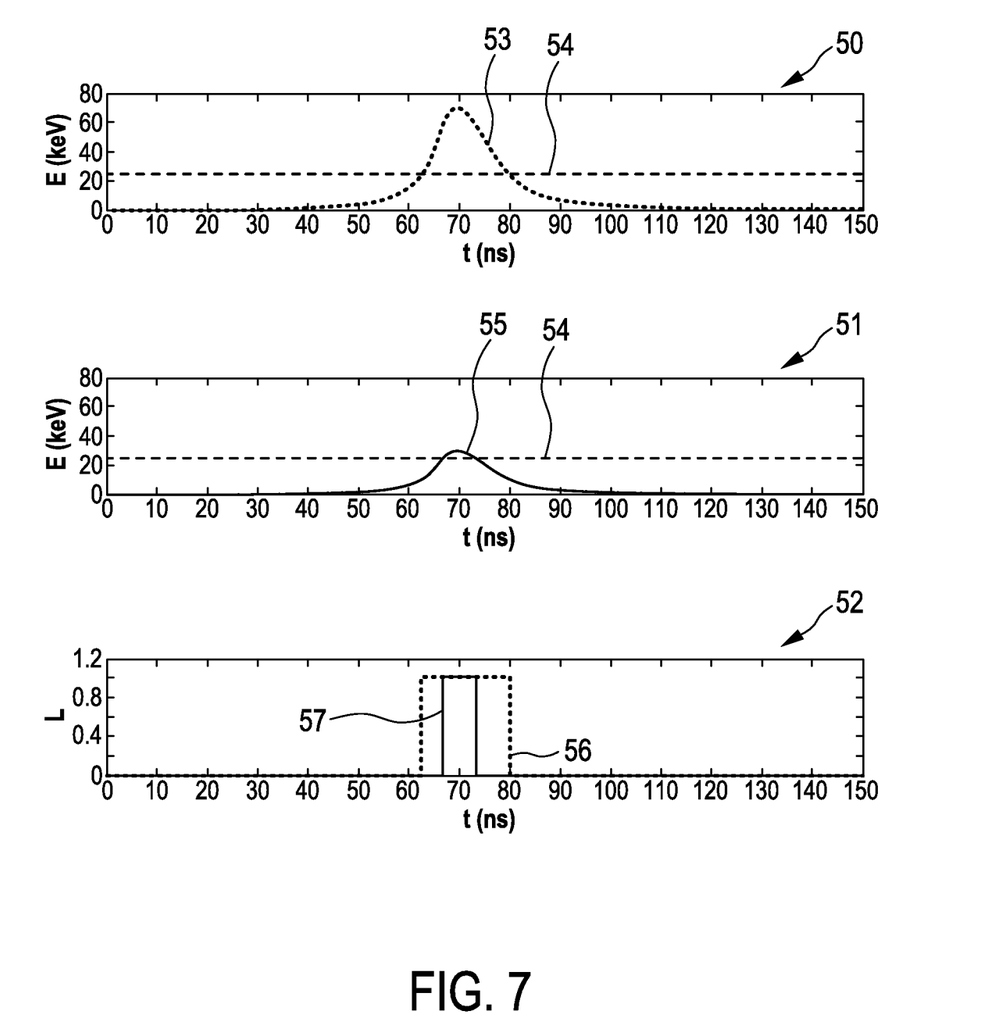
FIG. 7 shows schematically and exemplarily detection pulses representing shared charges and corresponding outputs of a discriminator.

Charge sharing events are generally simultaneous in time within, for instance, picoseconds, i.e. an event sharing charge across two or more detection pixels, or in other words an incident photon generating charge across two or more detection pixels, will be registered by the front-end electronics, i.e. by the detection device, at substantially the same point in time. FIG. 7 schematically and exemplarily illustrates a possible charge shared event across two detection pixels, wherein a first detection pixel registers 70 keV as indicated in the first graph 50 and a second detection pixel registers 30 keV as illustrated in a second graph 51 from an incident photon having an energy of 100 keV. In the two graphs 50, 51 the detection pulses provided by the respective shapers are denoted by 53, 55 and reference number 54 indicates a signal threshold. The detection pulses are indicative of the energy such that on the vertical axes of the graphs 50, 51 the respective energy E in keV is shown.

Due to the detection pulse dynamics and time-over-threshold, the detection pixel with the largest charge will cross a given signal threshold 54, which is preferentially the same for all detection pixels, earlier in time and its discriminator output will be the longest active as indicated in the third graph 52, wherein reference number 56 indicates the discriminator level L of the first detection pixel and reference number 57 indicates the discriminator level L of the second detection pixel. The photon count values determination system, i.e. the detection device 6, can be adapted such that, if a detection pixel registers an event by means of a leading edge of a discriminator output, i.e., if a signal threshold of the discriminator is traversed in an upward direction, it immediately requests priority, if allowed to do so. As illustrated in FIG. 7, the detection pixel with the largest charge will also trigger the signal threshold first. Preferentially at that moment an event observation window starts, wherein this time window preferentially corresponds to an estimated peaking time of the shaper output of, for instance, 10 ns. Any other detection pixel of the same cluster registering a leading edge of its lowest threshold will immediately be refused its priority, because another detection pixel did so earlier, and its shaper output will be connected to the adder of the detection pixel that was granted priority. At the same time the counters of the corresponding "shared" detection pixels are preferentially disabled. The summing takes place before the discriminator, i.e. the detection pixel that had requested priority "sees" its amplitude increased by the additional signal from the detection pixels of the same cluster that had triggered on the very same peaking time window. The detection pixels are preferentially disconnected from the adder as soon as any of the involved detection pixels registers a downward transition of their discriminators. At this moment it is assumed that the event that caused the charge sharing has been fully processed. The shapers may still be tailing, but summing is not required any longer as the maximum has already been reached. This disconnection can ensure that the summing function is not paralyzed in high pile-up conditions.

The peaking time can be estimated by simulation based on the known construction of the sub detection pulse providing unit, wherein this simulation especially considers the transient response of the conversion material, which is arranged between the cathode and the pixelated anode and which might be, for instance, a CZT conversion material. The peaking time may also be measured, in order to determine the actual performance of the sub detection pulse providing unit. For instance, the conversion material may be characterized during production/screening. The transient time may be measured by using a gamma source and observing the transient response of the sub detection pulse providing unit by means of a charge sensitive amplifier with a rise time of, for instance, 10 to 90 percent, which will correspond to the peaking time when using the shaper. This provides a statistical margin where the time threshold can be, wherein the time threshold can be set to the worst case, excluding outliers. Furthermore, the peaking time of the shaper can be known by simulations or by experimentally injecting charges and observing the transient response. This can be done on a test bench prior to integration on a scanner. This can also be carried out together with the conversion material and a radioactive source. Moreover, during a calibration step the optimum time threshold may be adjusted such that a minimum low energy tail is observed, i.e. a number of threshold scans may be performed with a radioactive source or an x-ray source, in order to find a best fit to an expected spectrum without charge sharing or with an expected degree of charge sharing.

An upward transition of a threshold would typically be used to count, i.e. to increment, a photon count value. In order to have some time for deciding whether an event should be counted at all by the respective counter, a delay line can be present between the discriminators and the counters. If a respective event is caused by charge sharing such that the respective shaper is to be connected to an adder of another detection pixel, the counter may be disabled before the delay line has elapsed. The delay line can be defined to be longer than the width of the discriminator output at the lowest signal threshold. It should be noted that the delay line will not affect performance, because it is just latency.

If a detection pixel has been granted priority, preferentially the observation time is only restricted to the peaking time, i.e. if another detection pixel registers an event outside of this window, this detection pixel is allowed to process its detection pulse independently. In fact, this other detection pixel may start an own priority process. This means, for instance, in a 2×2 cluster two detection pixels may be sharing an event and the other two detection pixels may be sharing another event, depending on whether the signal threshold crossings where registered at different points in time out of their respective peaking time windows. The maximum count rate is therefore preserved when compared with a 2×2 implementation without charge sharing.

For connecting and disconnecting shapers to adders or summing nodes switches can be used. In particular, the described correction process can be implemented by digital means, either with flip-flops or state machines that control the position of the switches.

In FIG. 7 a signal threshold 54 of 25 keV is exemplarily shown. Practically this would mean that registered shared events below 25 keV will not be included to the summing mode. The lowest threshold within a discriminator used for the charge sharing correction is therefore lower in a preferred embodiment, in particular, within a range of 2 to 5 keV.

Although in above described embodiment a "first takes all" scheme has been used for the charge sharing correction, in other embodiments other charge assigning schemes can be used. For instance, a scheme can be used in which the detection pixel with the largest detection pulse amplitude receives also the charge from neighboring detection pixels of the same cluster, if they detect this charge at substantially the same time.

Although in above described embodiments the imaging system is a computed tomography system, in other embodiments the imaging system can be another imaging system, especially another x-ray imaging system like a C-arm x-ray imaging system. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or devices may fulfill the functions of several items recited in the claims. The mere fact that certain measures are recited in mutually different dependent claims does not indicate that a combination of these measures cannot be used to advantage.

Procedures like amplification, shaping, adding, discriminating, counting, applying the model for correcting charge sharing, et cetera performed by one or several units or devices can be performed by any other number of units or devices. These procedures and/or the control of the imaging system in accordance with the imaging method and/or the control of the photon count values determination system in accordance with the photon count values determination method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a detection values determination system, especially for photon-counting CT scanners, comprising a detection pulse providing unit for providing detection pulses for an array of detection pixels, which is provided with an anti-charge-sharing grid for suppressing charge sharing between different clusters of the detection pixels, wherein the detection pulses are indicative of the energy of photons incident on the detection pixels. Charge-sharing-corrected detection values are determined based on the provided detection pulses, wherein for determining a charge-sharing-corrected detection value for a detection pixel of a cluster only detection pixels of the same cluster are considered. This allows for a relatively high DQE, wherein the technical efforts for providing the charge sharing correction can be relatively low.

The invention claimed is:

1. A detection values determination system, comprising:
a digital storage memory configured to store processor executable instructions; and
at least one processor configured to execute the processor executable instructions to:

provide detection pulses for an array of detection pixels, which is provided with an anti-charge-sharing grid for suppressing charge sharing between different clusters of detection pixels of the array, wherein the detection pulses are indicative of energy of photons incident on the detection pixels; and determine charge-sharing-corrected detection values based on the provided detection pulses, wherein each charge-sharing-corrected detection value corresponds to a respective detection pixel and is corrected for charge-sharing between neighboring detection pixels, wherein for determining a charge-sharing-corrected detection value for a detection pixel of a cluster, only detection pixels of the same cluster are considered.

2. The detection values determination system according to claim 1, wherein the at least one processor is further configured to:

compare the detection pulse with at least one signal threshold; and generate at least one detection value depending on comparison of the detection pulse with the at least one threshold, wherein:

if a lowest signal threshold is traversed in an upward direction by a detection pulse and if a priority is not assigned to another detection pixel of the same cluster, the priority is assigned to the detection pixel.

3. The detection values determination system according to claim 1, wherein the at least one processor is further configured to receive a clustering input defining a desired clustering of the detection pixels, wherein the at least one processor is configured to consider the desired clustering defined by the clustering input while determining a charge-sharing-corrected detection value for a detection pixel.

4. The detection values determination system according to claim 1, wherein the at least one processor is configured to determine charge-sharing-corrected detection values for a detection pixel of a cluster only if the rate of providing the detection pulses for the detection pixels of the cluster is smaller than a predefined threshold.

5. The detection values determination system according to claim 1, wherein the at least one processor is configured to:

determine non-charge-sharing-corrected photon count values for each detection pixel based on the provided detection pulses, wherein each non-charge-sharing-corrected photon count value is indicative of a number of photons within a certain energy range detected by a respective detection pixel;

provide a model for modeling charge sharing effects, wherein the model is configured to consider charge sharing only between detection pixels of a same cluster; and determine the charge-sharing corrected detection values by using the provided model and the determined non-charge-sharing corrected photon count values.

6. The detection values determination system according to claim 5, wherein the at least one processor is configured to:

provide the model that provides a relation between the non-charge-sharing-corrected photon count values of detection pixels of a same cluster and charge-sharing corrected decomposed detection values of the detection pixels of the same cluster, wherein the charge-sharing corrected decomposed detection values correspond to different materials and/or different physical effects; and determine, as the detection values, charge-sharing corrected decomposed detection values by using the model and the determined non-charge-sharing corrected photon count values.

7. An imaging system for generating an image of an object, the imaging system comprising:

a detection values determination system for determining charge-sharing-corrected detection values according to claim 1; and an image generator configured to generate an image of the object based on the determined charge-sharing corrected detection values.

8. A detection values determination method, comprising:

providing detection pulses for an array of detection pixels;

providing an anti-charge-sharing grid for suppressing charge sharing between different clusters of detection pixels of the array, wherein the detection pulses are indicative of the energy of photons incident on the detection pixels;

determining charge-sharing-corrected detection values, wherein each charge-sharing-corrected detection value corresponds to a respective detection pixel and is corrected for charge-sharing between neighboring detection pixels; and determining a charge-sharing-corrected detection value for a detection pixel of a cluster by considering; only detection pixels of the same cluster.

9. A computer program, embedded in a non-transitory computer readable medium, for controlling a detection values determination system, the computer program causing the detection values determination system to carry out the detection values determination method according to claim 8.

* * * * *